United States Patent

[11] 3,587,750

| [72] | Inventors | John Isaac Cantral;<br>Robert Otto Taube, Moline, Ill. |
|---|---|---|
| [21] | Appl. No. | 793,984 |
| [22] | Filed | Jan. 27, 1969 |
| [45] | Patented | June 28, 1971 |
| [73] | Assignee | Deere & Company<br>Moline, Ill. |

[54] ROW MARKER
7 Claims, 2 Drawing Figs.

[52] U.S. Cl. ................................................. 172/130,
91/414
[51] Int. Cl. ....................................................... A01b 35/32,
F15b 13/06
[50] Field of Search .......................................... 172/130,
126—129, 131, 132, 7; 111/33; 91/414

[56] References Cited
UNITED STATES PATENTS

| 3,144,723 | 8/1964 | Carter | 172/2X |
| 3,511,316 | 5/1970 | Oerman et al. | 172/126 |
| 2,720,716 | 10/1955 | White | 172/4.5 |
| 3,158,204 | 11/1964 | Martin | 172/126 |
| 3,250,333 | 5/1966 | Day | 172/126 |

*Primary Examiner*—Robert E. Pulfrey
*Assistant Examiner*—Stephen C. Pellegrino
*Attorneys*—H. Vincent Harsha, Harold M. Knoth, William A. Murray and John M. Nolan ABSTRACT: Row markers for agricultural implements in which the marker arms are pivotally mounted to the implement, are gravity urged downwardly to the working positions, and are raised by hydraulic cylinders. The cylinders are connected in parallel and are alternately connectable with a fluid source and reservoir provided on a propelling vehicle. A solenoid valve is associated with each cylinder and normally prevents the flow of fluid from the cylinders, but provide free flow of fluid to and from the cylinders when activated so that the marker arms are selectively lowered by selectively activating the solenoid valves.

INVENTORS.
JOHN I. CANTRAL
ROBERT O. TAUBE

ROW MARKER

BACKGROUND OF THE INVENTION

The present invention relates generally to row markers for agricultural implements, and more specifically to an improved control system for selectively raising and lowering the marker arms.

Many agricultural implements such as planters, listers and the like are provided with row markers which provide a small groove in the earth laterally outwardly of the implement so that the equipment operator, by following the groove on the next pass down the field, can maintain a substantially parallel relationship between the rows of crops being planted through the entire width of the field. The conventional row marker consists of a pair of arms pivotally mounted to the opposite sides of the implement for movement between lowered working positions and raised positions. A suitable tool such as a disc is mounted on the outer end of each arm to provide the groove. It has also become conventional to raise and lower the marker arms with extensible and retractable hydraulic cylinders which are connected to the hydraulic system of the tractor propelling the implement so that the tractor operator can control the arms without dismounting the tractor.

Since not all tractors are provided with a sufficient number of hydraulic circuits for remote functions to control each marker arm cylinder individually, the marker arm cylinders have been connected in parallel and to a single circuit for remote hydraulic functions. In order that a single arm can be lowered, a latching mechanism is provided to automatically lock each arm in its raised position and a trip rope extends from each cylinder to the operator's station on the tractor. A single arm can then be lowered by exhausting both cylinders and tripping the latching mechanism for the selected arm. The above described row markers and controls therefore are illustrated in U.S. Patent No. 3,250,333 issued 10 May 1966 to Leon E. Day.

While the above described row marker and controls for raising and lowering the same have, in the past, fulfilled the needs of farmers and have been accepted commercially, they can not be used with tractors provided with the modern air conditioned or heated cabs since they would require an opening through the cab for the trip rope.

SUMMARY OF THE INVENTION

The principle object of the present invention is to provide an improved control system for raising and selectively lowering hydraulic row markers.

A further object of the invention is to provide a control system for raising and selectively lowering hydraulic row markers which is compatible with the modern tractor provided with air conditioned or heated cabs.

According to the underlying principles of the invention, the hydraulic cylinders for the row markers are connected in parallel and to a single circuit for remote hydraulic functions, and a solenoid valve is interposed in the fluid lines leading to each cylinder. Each solenoid valve normally prevents fluid flow from the associated cylinder while permitting fluid flow to the associated cylinder, but, when activated, affords free flow of fluid to and from the associated cylinder.

The above objects and additional objects and advantages will become apparent along with the details of construction of a preferred embodiment of the invention to those skilled in the art from a reading of the following detailed description when taken in conjunction with the accompanying drawing.

DESCRIPTION OF THE PREFERRED EMBODIMENT

Figure 1:
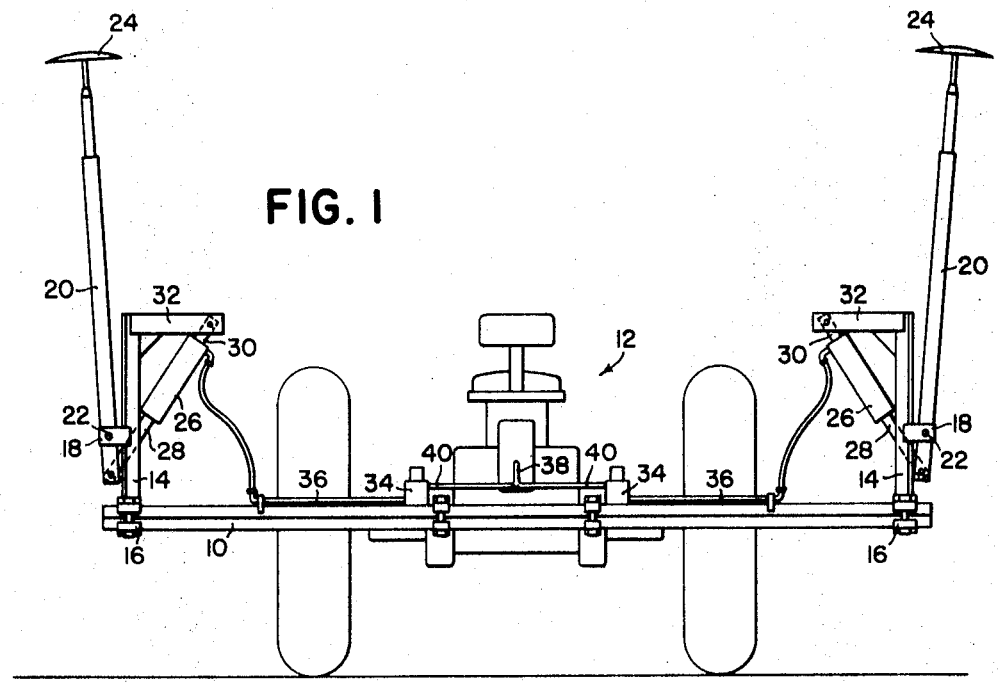
FIG. 1 is a rear elevation view of a tractor mounted tool bar provided with the row markers according to the invention.

Referring to the drawing, a tool bar 10 is integrally mounted in the conventional manner to the conventional three-point hitch of a tractor indicated generally at 12. The tool bar 10 is adapted to carry a plurality of tools such as planting units or the like. However, the tools do not form part of the invention and are therefore not disclosed for simplicity purposes.

A generally upwardly extending mounting frame 14 is secured adjacent each end of the tool bar 10 by clamps 16. A pair of spaced, outwardly extending and apertured ears 18 are secured in any suitable manner to each frame intermediate the ends thereof, and a marker arm 20 is pivotally mounted between each pair of ears by a pivot pin 22. Each marker arm is pivotally mounted to the ears at a point spaced from the inner end thereof a distance slightly less than the distance between the lower end of the mounting frame and the associated outwardly extending ears. The outer end of each marker arm carries a disc 24 which will provide a groove along the earth when the arm is lowered.

The movements of each marker arm 20 between the lowered and raised positions is under the control of a single-acting extensible and retractable hydraulic cylinder 26 which has its rod end 28 pivotally connected to the inner end of the associated arm 20 and its anchor end 30 pivotally connected to the free end of an inwardly extending bracket 32. The hydraulic cylinders 26 are so connected to the arms 20 that when fluid under pressure is supplied to the anchor ends of the cylinders the rods 28 will be forced outwardly to raise the arms and when fluid is exhausted from the anchor ends of the cylinders the arms 20 will be moved downwardly by the biasing force of gravity and the rods 28 will be moved inwardly.

The anchor end of each cylinder 26 is placed in fluid communication with one side of a solenoid valve 34 by a fluid line 36 and the opposite side of each solenoid valve 34 is connected to a main fluid line 38 by branch fluid lines 40. The main fluid line 38 is connected to a conventional remote cylinder outlet 42 which is selectively connectable with a source of fluid pressure such as a pump 44 and a fluid reservoir 46 by operation of a manual control valve 48 which is placed in a position convenient to the tractor operator station. The remote cylnder outlet 42, pump 44, reservoir 46, and valve 48 are all conventional components of agricultural tractors.

Figure 2:
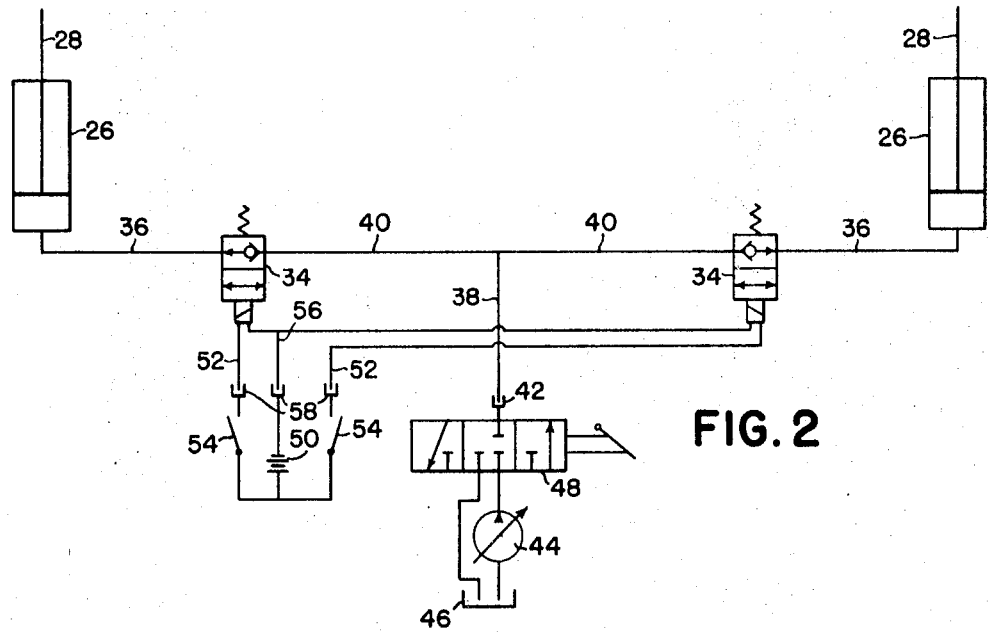
FIG. 2 is a schematic view of the control system for the row markers illustrated in FIG. 1.

Each of the solenoid valves 34 is normally biased to a first position as illustrated in FIG. 2 in which it permits the flow of fluid to the associated cylinder 26 and blocks the flow of fluid from the associated cylinder. However, when activated, each solenoid valve will move to a second position in which it affords free flow of fluid both to and from the associated cylinder 26. For the purpose of activating the solenoid valves 34 they are connected to a suitable source of electrical energy or battery 50 which may conveniently be the tractor battery. Each solenoid valve is connected to one side of the battery 50 by an electrical line 52 through a switch 54 and is connected to the other side of the battery 50 by a common electrical line 56. The electrical lines 52 and 56 are preferably provided with a releasable coupling 58 so that the implement can be disconnected from the tractor without removing all of the wiring from the tractor. The switches 54 are mounted on the tractor in a position convenient to the operator's station.

Having thus described the construction of a preferred embodiment of the invention, its operation is as follows: To raise either or both of the marker arms it is only necessary to move the control valve 48 to the left to its supply position so that fluid under pressure from the pump 44 will be supplied to the anchor ends of the cylinders 26 to extend the rods 28 and raise the arms 20. The position of the solenoid valves is not important when raising the arms 20 since they permit the flow of fluid to the cylinders at all times.

To lower either arm, the control valve 48 is moved to the extreme right to its exhaust position and the solenoid valve for the selected marker arm is activated by closing its switch. Specifically, when the valve 48 is in its exhaust position, fluid pressure is exhausted from the fluid lines 38 and 40. The solenoid valves maintain the pressure within the fluid lines 36 and cylinders 26 until they are activated. When the solenoid valve for the desired marker is activated by closing the appropriate switch 54 it will be moved upwardly as viewed in FIG. 2 to its open position in which it affords the flow of fluid from its associated cylinder 26 so that the desired marker arm 20 is lowered under the force of gravity. The other marker arm 20 will be maintained in its raised position by the other solenoid valve 34. Once the desired marker arm 20 is lowered, the switch 54 is again opened.

From the above descriptions of construction and operation of a preferred embodiment of the invention it can be seen that the present invention provides a control system for hydraulic marker arms which can be operated from a single hydraulic circuit for remote functions and does not require the use of trip ropes which prevent the use of air conditioned or heated cabs.

While the preferred embodiment of the invention has been illustrated and described, it will be apparent to those skilled in the art that variations and modifications thereof can be made without departing from the underlying principles of the invention.

We claim:

1. In an agricultural implement having opposite sides, a marker arm pivotally mounted on the implement adjacent each side for movement between raised and lowered positions, each arm having a bias to the lowered position, an extensible and retractable hydraulic actuator operatively connected between each arm and the frame to move the arm to the raised position when supplied with fluid, a source of fluid pressure and a fluid reservoir, fluid line means connecting the actuators in parallel and alternately to the source and reservoir, the improvement comprising: a pair of solenoid controlled valve means interposed in the fluid line means, one of the solenoid controlled valve means being associated with each actuator and each being movable between a first position in which it affords free flow of fluid to and blocks the exhaust of fluid from the associated actuator and a second position in which it affords free flow of fluid to or from the associated actuator.

2. The implement set forth in claim 1 wherein each solenoid controlled valve means is in the first position when deactivated and in the second position when activated.

3. The implement set forth in claim 2 wherein each actuator comprises a single acting extensible and retractable hydraulic cylinder.

4. The implement set forth in claim 3 wherein the fluid line means includes first and second fluid lines each having a first end connected with a respective cylinder, a third fluid line having a first end connected with a second end of each of the first and second fluid lines, a manual control valve selectively movable to either side of a neutral position to supply and exhaust positions having a first side connected to a second end of the third fluid line, and additional fluid lines connecting a second side of the control valve to the source and reservoir.

5. The implement set forth in claim 4 wherein the solenoid valves are interposed in the first and second fluid lines.

6. An agricultural implement having opposite sides, a pair of upstanding frames mounted on the implement adjacent the sides, a marker arm pivotally mounted to each frame for movement between a lowered working position and a raised position, an extensible and retractable hydraulic cylinder operatively connected between each frame and the associated marker arm to raise the arm when supplied with fluid under pressure, a source of fluid pressure and a fluid reservoir, first fluid line means interconnecting the cylinders, second fluid line means connected to the first fluid line and being alternately connectable to the source of fluid pressure and fluid reservoir, and a solenoid controlled valve means interposed in the first fluid line means on each side of the connection with the second fluid line means, each solenoid controlled valve means being movable between a first position in which it affords free flow of fluid to and blocks the flow of fluid from the associated cylinder and a second position in which it affords free flow of fluid to and from the associated cylinder.

7. The implement set forth in claim 6 wherein each marker arm is pivotally mounted to the associated frame at a location remote from the upper end of the frame and spaced from one end of the arm, and the associated cylinder extends between the upper end of the frame and the one end of the arm.

UNITED STATES PATENT OFFICE
CERTIFICATE OF CORRECTION

Patent No. 3,587,750          Dated 28 June 1971

Inventor(s) John Isaac Cantral et al

It is certified that error appears in the above-identified patent and that said Letters Patent are hereby corrected as shown below:

Column 4, line 37, change "6" to -- 1 --.

Signed and sealed this 22nd day of February 1972.

(SEAL)
Attest:

EDWARD M. FLETCHER, JR.       ROBERT GOTTSCHALK
Attesting Officer      Commissioner of Patents